United States Patent [19]

Mundschenk et al.

[11] Patent Number: 4,602,202
[45] Date of Patent: Jul. 22, 1986

[54] UNIVERSAL CONNECTOR FOR RECHARGEABLE AND NON-RECHARGEABLE BATTERIES

[75] Inventors: Glenn R. Mundschenk; Robert C. Decker, both of Utica, N.Y.

[73] Assignee: General Electric Company, Portsmouth, Va.

[21] Appl. No.: 679,905

[22] Filed: Dec. 10, 1984

[51] Int. Cl.⁴ .................................................. H02J 7/00
[52] U.S. Cl. ........................................................ 320/2
[58] Field of Search ................................ 320/2.3; 429/7

[56] References Cited

U.S. PATENT DOCUMENTS

| | | | |
|---|---|---|---|
| 3,579,075 | 5/1971 | Floyd | 320/2 |
| 4,140,957 | 2/1979 | Rapp | 320/2 |
| 4,147,838 | 4/1979 | Leffingwell | 429/1 |
| 4,229,686 | 10/1980 | Mullersman et al. | 320/2 |
| 4,382,219 | 5/1983 | Heine et al. | 320/2 |

Primary Examiner—Patrick R. Salce
Assistant Examiner—Anita M. Ault

[57] ABSTRACT

A universal connector for use with rechargeable and nonrechargeable batteries having conventional terminals includes switching means for inherently permitting product energization from both types of batteries while connecting only a rechargeable battery to a battery charging circuit. The universal connector includes an actuating rod for operating the switching means, the rod coacting with unique physical configurations of the rechargeable and nonrechargeable batteries to open the charging circuit when connected to a nonrechargeable battery and to close the charging circuit when connected to a rechargeable battery.

10 Claims, 10 Drawing Figures

UNIVERSAL CONNECTOR FOR RECHARGEABLE AND NON-RECHARGEABLE BATTERIES

BACKGROUND OF THE INVENTION

1. Field of the Invention

This invention relates to connectors for rechargeable and non-rechargeable batteries and, more particularly, to an universal connector which inherently permits product energization from both types of batteries while connecting only a rechargeable battery to a battery charging circuit.

2. Description of the Prior Art

In existing products, if rechargeable batteries are to be used for product energization during power failures, a trickle charge must be provided to keep the batteries charged while not in use. Due to the expense of rechargeable batteries and the wide availability of non-rechargeable batteries, users often desire to use non-rechargeable batteries, intentionally forgoing the advantages of rechargeable batteries. If this is to be permitted, it is essential for safety reasons that means be provided to prevent attempted charging of the non-rechargeable battery. One way to assure that charging current will not be supplied to a non-rechargeable battery is to provide in a single product separate connectors for rechargeable and non-rechargeable batteries. These connectors take advantage of unique physical configurations of the batteries to assure that the connector for rechargeable batteries cannot be inadvertently connected to a non-rechargeable battery. For example, a typical 9-volt rechargeable battery has a recess provided between its terminals while a similar non-rechargeable battery does not have such a recess. The connector intended for use with a 9-volt rechargeable battery may be provided with a projection for entering the recess when the connector is attached to the terminals of the rechargeable battery. If an attempt is made to attach the connector to the terminals of a non-rechargeable battery, the solid wall between the battery terminals and the projection will contact each other and prevent engagement of the terminals of the connector with the terminals of the battery. An additional connector not having the projection is provided for connection to non-rechargeable batteries. While this approach assures that a non-rechargeable battery will not be inadvertently supplied with charging current, it is not entirely satisfactory in that it can confuse the user as to which connector to use with the different types of batteries and increase the product cost due to duplication of connectors and the necessity of a blocking diode to prevent attempted charging of the non-rechargeable battery. Moreover, this approach permits rechargeable batteries to be mistakenly connected to the non-charging connector in spite of clear instructions and warning labels. While this type of improper attachment does not represent a safety risk, it can lead to dissatisfaction on the part of the user because the rechargeable batteries will not thereafter be maintained in the charged condition he expects. As a result, the product will probably not work in the event of a power failure, and the unhappy user will be likely to think incorrectly that the product has failed to work properly.

SUMMARY OF THE INVENTION

It is therefore a primary object of the invention to provide a single connector for attachment to both rechargeable and non-rechargeable batteries.

Another object of the invention is to provide a single or universal connector that may be attached to both rechargeable and non-rechargeable batteries without introducing safety risks.

A further object of the invention is to provide a universal connector that inherently permits charging of rechargeable batteries and prevents attempted charging of non-rechargeable batteries.

An additional object is to provide a universal connector that permits charging of rechargeable batteries and prevents charging of non-rechargeable batteries without requiring conscious thought by the user as to the type of battery being connected and whether or not recharging should be permitted.

A still further object of the invention is to provide a universal connector for both rechargeable and non-rechargeable batteries that does not require written instructions or warning labels for proper operation.

Yet another object is to provide a universal connector for 9-volt batteries that exploits the recess that is present on most 9-volt rechargeable batteries and missing on non-rechargeable batteries.

Briefly stated, in carrying out the invention in one form, a battery connector is provided for an electrical product having battery recharging means and a load adapted for energization from a battery. The battery connector includes terminal means adapted to contact the output terminals of either a non-rechargeable battery having a first physical configuration or a rechargeable battery having a second physical configuration. The terminal means is coupled to the load of the product such that the load may be enerized from either the non-rechargeable battery or the rechargeable battery. A circuit means couples the terminal means and the battery recharging means, the circuit means including a switch having an open state preventing charging through the circuit means of a battery coupled to the terminal means and a closed state permitting charging through the circuit means of a battery coupled to the terminal means. An actuating means is coupled to the switch for moving the switch between its closed and open states, the actuating means adapted to coact with the first physical configuration of a non-rechargeable battery to move the switch to its open state and adapted to coact with the second physical configuration of a rechargeable battery to move the switch to its closed state. In this manner, the physical configuration of a battery connected to the battery connector determines whether or not the battery will be charged. By a further aspect of the invention, the first physical configuration includes a wall portion at a predetermined location relative to the battery connector when the terminal means is contacting the output terminals of the non-rechargeable battery, and the second physical configuration includes an absence of a wall portion at the predetermined location relative to the battery connector when the terminal means is contacting the output terminals of the rechargeable battery. The actuating means includes biasing means and a member movable between a first position in which the member extends into the predetermined location and a second position in which the member does not extend into the predetermined location, the member being aligned such that contact thereof with the wall portion of a non-rechargeable battery will move the member to the second position when a non-rechargeable battery is connected to the battery connector. The switch, the biasing means, and the member are interconnected such that the biasing means biases the switch and the member to the closed and first positions, respectively, and movement of the member to the second position moves the switch against the action of the biasing means to the open position. In accordance with further aspects of the invention, the terminal means comprises a pair of spaced-apart terminals adapted for connection to conventional 9-volt battery terminals, and the member comprises a plunger located between the pair of terminals. The plunger has an axis parallel to the axes of the pair of terminals, the plunger being movable along its axis between the second position in which the distal end of the plunger extends a predetermined distance from the connector and the first position in which the distal end of the plunger extends a greater predetermined distance from the connector. The biasing means in one form comprises a conductive spring element, which also comprises at least a portion of the switch.

In a particularly preferred form of the invention, the connector includes a housing and a pair of terminals mounted on the exterior of the housing for connection to the output terminals of a battery, a selected one of the pair of terminals extending through the housing into the interior of the housing. Means is provided for electrically coupling the pair of terminals to the load. An electrically conductive element within the housing is movable between a first position in which it contacts the selected terminal and a second position in which it is spaced from the selected terminal. Means is provided for electrically coupling the conductive element to the battery recharging means. An operating means is coupled to the conductive element and extends therefrom through the housing to the exterior thereof, the operating means being operable from the exterior of the housing for selectively moving the conductive element from its first position to its second position. The electrically conductive element is a spring element that is relatively unstressed in its first position and relatively stressed in its second position. The stress induced within the spring element as a result of operation of the operating means biases the spring element toward its first position from its second position such that it moves to its first position and contacts the selected terminal when operation of the operating means ceases. The means for electrically coupling the spring element to the battery recharging means includes a third terminal on the interior of the housing, the spring element contacting the third terminal when the spring element is in at least its first position.

BRIEF DESCRIPTION OF THE DRAWINGS

While the novel features of the invention are set forth with particularity in the appended claims, the invention, both as to organization and content, will be better understood and appreciated, along with other objects and features thereof, from the following description taken in connection with the drawings, in which:

DESCRIPTION OF A PREFERRED EMBODIMENT

Figure 1:
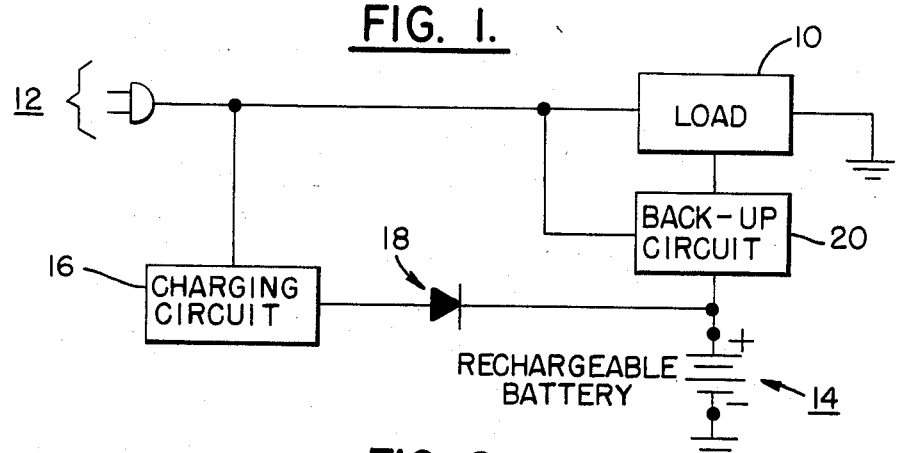
FIG. 1 is a schematic diagram of a desired circuit when a rechargeable battery is used in a product having a battery charging circuit and a back-up circuit permitting the product to be powered by the battery during periods of a-c power failure.

FIG. 1 shows a typical circuit having a load 10 adapted to be powered from either a source 12 of alternating current (a-c) electric power or, in the event of failure of the a-c source 12, a rechargeable battery 14. When a-c power is available from the source 12, the battery 14 is maintained in its fully charged state by a trickle current from the a-c source 12 through a charging circuit 16 and a diode 18. The rechargeable battery 14 is coupled to the load 10 through a back-up circuit 20 to supply electric power to the load 10 when there is a failure of the a-c power source 12. The battery back-up circuit 20 is also coupled to the source 12 and functions to prevent the supply of electric current to the load 10 from the battery 14 when power is available from the source 12 and to permit the supply of electric current to the load 10 from the battery 14 when power is not available from the source 12. Appropriate circuits for the charging circuit 16 and the back-up circuit 20 are well-known to persons skilled in the art, and their design forms no part of the present invention. Moreover, while the load 10 is shown being supplied by current from a source of a-c electric power, such as that normally available from household wiring, it should be appreciated that common practice would call for appropriate circuitry to convert a-c current from the source 12 to d-c current for energizing the load 10. Again, such apparatus does not constitute a part of the present invention, and it is assumed that the load 10, the charging circuit 16, and the back-up circuit 20 include such apparatus to the extent necessary or appropriate.

In the circuit of FIG. 1, it is essential that the rechargeable battery 14 not be replaced by a non-rechargeable battery having the same terminal configuration. If such a replacement were made, the charging circuit would continue to supply a trickle charging current to the replacement battery with potentially harmful results. It would be possible to use a non-rechargeable battery 22 if it were somehow decoupled from the charging circuit 16 as illustrated schematically by FIG. 2. Otherwise, the circuit of FIG. 2 is identical to that of FIG. 1, and the various components thereof are identified by the same numerals.

Figure 2:
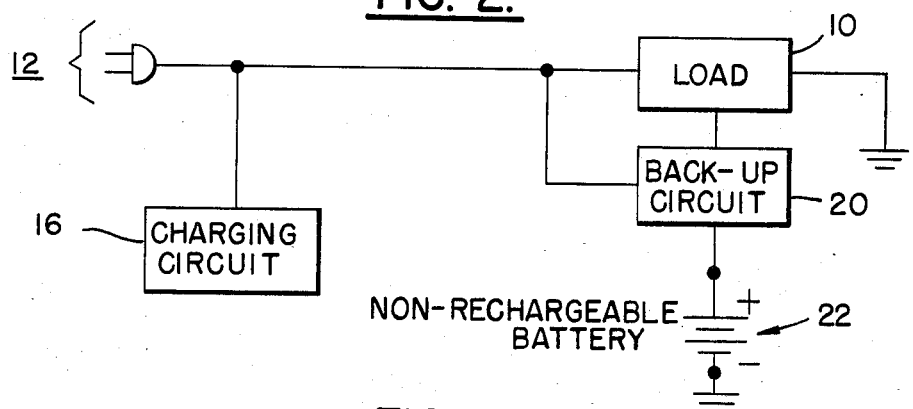
FIG. 2 is a schematic diagram of a desired circuit when a non-rechargeable battery is used in a product having a battery charging circuit and a back-up circuit permitting the product to be powered by the battery during periods of a-c power failure.
Figure 3:
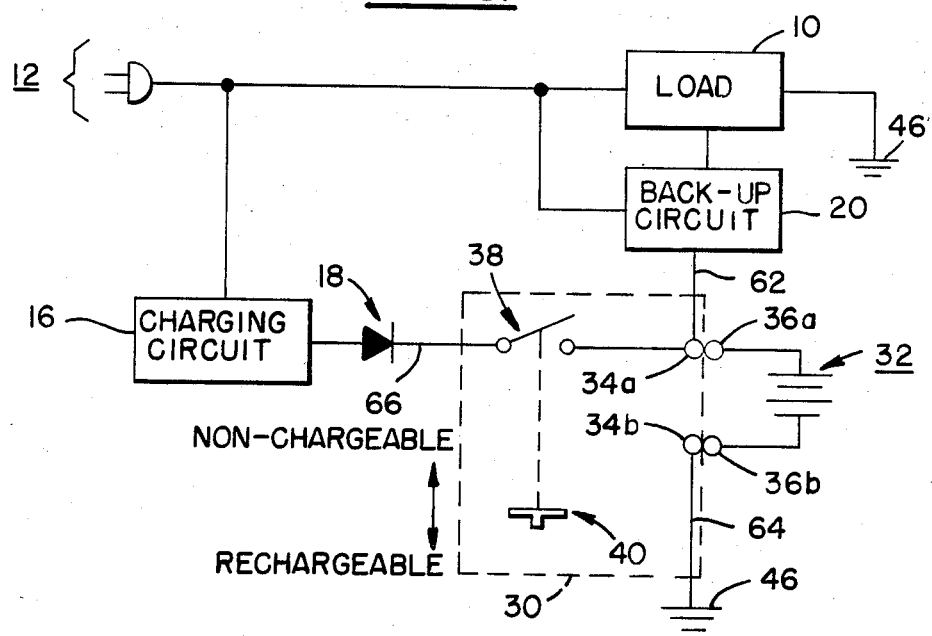
FIG. 3 is a schematic diagram of the circuit provided by the battery connector of the present invention.
Figure 4:
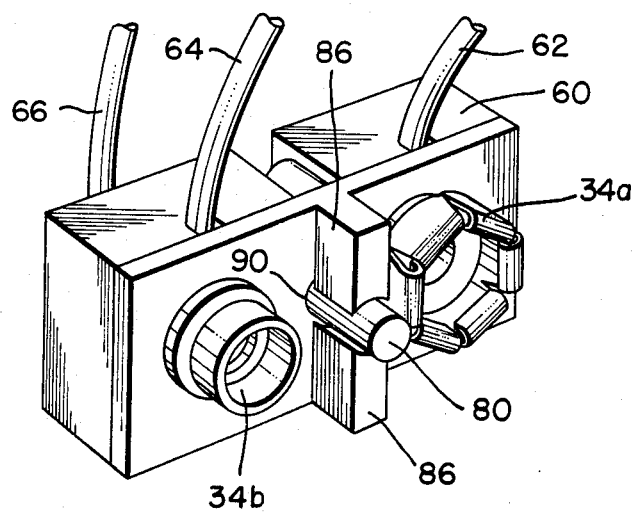
FIG. 4 is a perspective view of the battery connector of the invention.

As shown schematically by FIG. 3, the battery connector 30 of the present invention inherently provides the desired circuit configuration of FIG. 1 when connected to a rechargeable battery and the desired circuit configuration of FIG. 2 when connected to a non-rechargeable battery, the numeral 32 referring generally to both battery types. The desired circuit configurations are attained automatically without thought or action on the part of the user, apart from snapping the conventional terminals of the connector onto the terminals of the selected battery. Except for the battery connector 30, the circuit of FIG. 3 is identical to those of FIGS. 1 and 2, and the other circuit components are identified by identical numerals.

In broad terms, the connector 30 of FIG. 3 includes terminal means 34a and 34b adapted to contact the output terminals 36a and 36b of either type of battery 32. The connector 30 also comprises circuit means including a switch 38 coupling the terminal means 34 and the charging circuit 16. The switch 38 has the illustrated open state and a closed state, the open state preventing charging of the battery 32 and the closed state permitting charging of the battery 32. An actuating means 40 is coupled to the switch 38 for moving the switch 38 between its open and closed states. More particularly, the actuating means 40 is adapted to coact with the physical configuration of a non-rechargeable battery to move the switch 38 to its open state and to coact with the physical configuration of a rechargeable battery to move the switch 38 to its closed state. In this manner, the physical configuration of a battery 32 connected to the connector 30 solely determines whether or not the battery will be charged.

Figure 5:
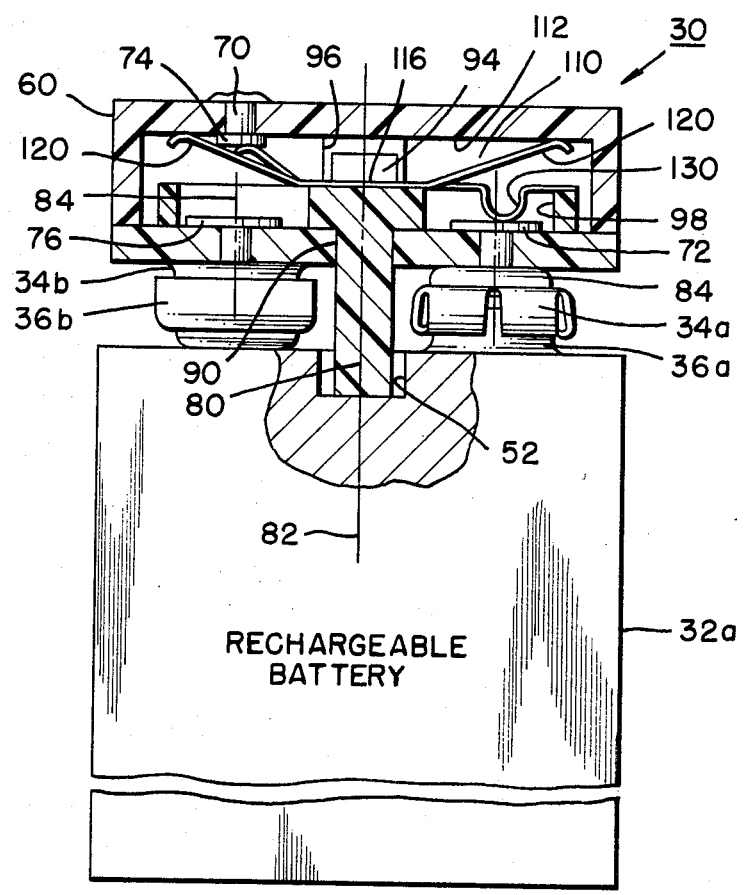
FIG. 5 is a view, partially in cross-section, of the battery connector of the invention attached to a typical 9-volt rechargeable battery.
Figure 6:
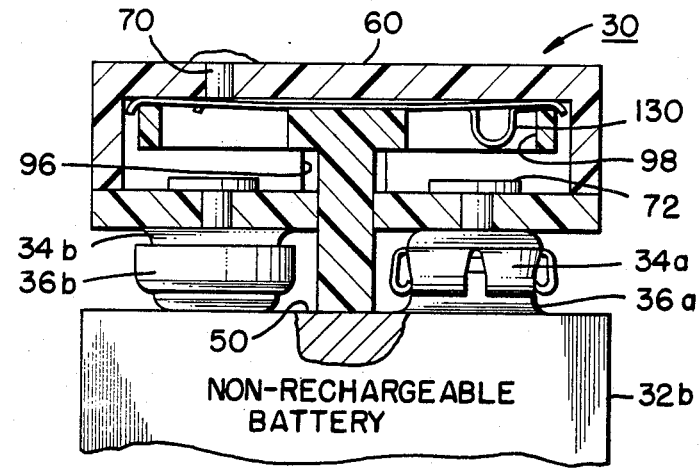
FIG. 6 is a view, partially in cross-section, of the battery connector attached to a typical 9-volt non-rechargeable battery.
Figure 7A:
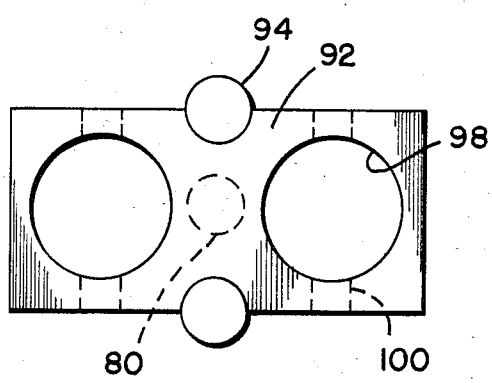
FIGS. 7a and 7b are top and side views, respectively, of the plunger comprising a portion of the battery connector of the invention.
Figure 7B:
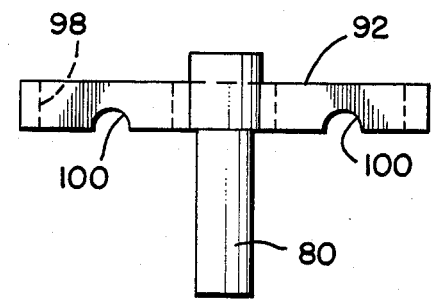

Before proceeding with a detailed description of the connector 30, it should be noted from FIGS. 5 and 6 that conventional 9-volt rechargeable and non-rechargeable batteries have unique physical configurations. More particularly, 9-volt non-rechargeable batteries 32b (FIG. 6) have a continuous or solid wall portion 50 extending between their terminals 36a and 36b, and 9-volt rechargeable batteries 32a (FIG. 5) typically have a recess 52 (absence of a wall portion) between their terminals 36a and 36b. The actuating means 40, which includes a plunger rod 80, senses the presence or absence of a wall portion 50 when the connector terminals 34 are connected to the battery terminals 36, the switch 38 of FIG. 3 moving either to its open state in response to the presence of a wall portion 50 or to its closed state in response to the absence of a wall portion (presence of a recess 52).

The configuration of the unique battery connector 30 of this invention will now be described with reference to FIGS. 3–8. In the illustrated embodiment, the connector 30 includes a hollow housing 60 having three wires 62, 64, and 66 connected thereto. The wire 62, connected to the positive terminal 34a, leads to the back-up circuit 20, and the wire 64, connected to the negative terminal 34b, leads to ground 46. The wire 66, connected to a third terminal 70, leads to the diode 18 and the charging circuit 16. The positive terminal 34a extends through the lower wall of the housing 60 to the interior thereof where it terminates in a contact face 72. Similarly, the terminal 70 extends through the upper wall of the housing 60 to the interior thereof where it terminates in a contact face 74. The terminal 34b also extends through the lower wall of the housing to the interior thereof where it terminates in a face 76. The contact faces 72 and 74 are necessary for the practice of the invention in the illustrated embodiment thereof, whereas the primary functions of the face 76 are to anchor the terminal 34b and to provide a convenient surface for the attachment of the wire 64. It is not essential that the terminal 34b extend through the wall of the housing 60.

A cylindrical plunger rod 80 is located between the terminals 34a and 34b on an axis 82 parallel to the axes 84 of the terminals 34a and 34b. The plunger rod 80, which is movable along the axis 82, is guided by guide ribs 86 on the exterior of the housing 60. The plunger rod 80 extends through a circular opening 90 between the terminals 34 into the interior of the housing 60. At its inner end, the plunger rod 80 is secured to an essentially flat plate 92 disposed in a plane normal to the axis 82 of the rod 80. The plate 92 has a pair of cylindrical elements 94 laterally spaced-apart thereon. The cylindrical elements 94 have axes parallel with the axis 82 of the rod 80, and the elements 94 are received in semicircular grooves 96 in the interior walls of the housing 60 to help guide the rod 80 and the plate 92 as the rod 80 (and the plate 92) is moved along the axis 82 between the extreme positions illustrated by FIGS. 5 and 6. The plate 92 has a pair of large cylindrical openings 98 disposed on the axes 84. A pair of semicylindrical cross channels 100 are provided in the lower surface of the plate 92 to accommodate the wires 62 and 64 when the plate 92 is in the extreme position illustrated by FIG. 5.

Figure 8A:
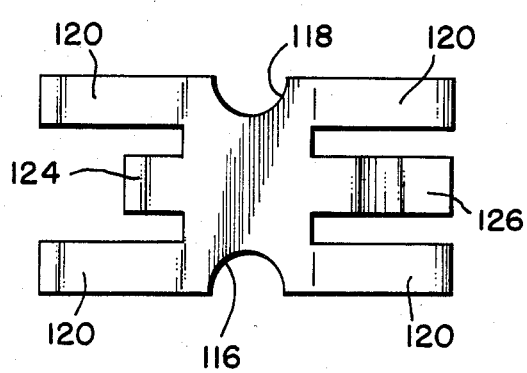
FIGS. 8a and 8b are top and side views, respectively, of the spring element comprising a portion of the battery connector of the invention, the spring element being illustrated in its non-deformed and unstressed state.
Figure 8B:
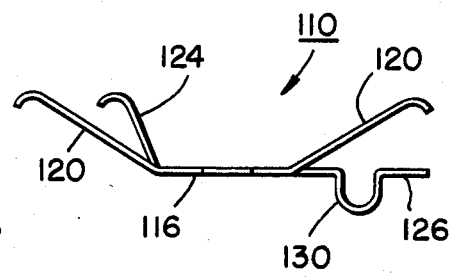

A spring element 110 is positioned between the upper surface of the plate 92 and the top wall 112 of the housing 60, the spring element 110 being shown in a totally unstressed, unassembled state by FIGS. 8a and 8b, a relatively unstressed state by FIG. 5, and a substantially stressed state by FIG. 6. The spring element 110 is formed from thin sheet phosphor bronze, or similar material characterized by both high electrical conductivity and resilience. The spring element 110 includes a flat central portion 116 having a pair of semicircular cutouts 118 at the lateral edges thereof for permitting the spring element 110 to be positioned between the cylindrical guides 94 of the plate 92. The central portion 116 engages the upper surface of the plate 92 at all times. At each end of the central portion 116, a pair of spaced-apart legs 120 are angled upwardly therefrom into engagement at their outer ends with the inner surface 112 of the top wall 112 of the housing 60 at all times. A leg 124 is provided at one end of the central portion 116 between the associated legs 120, the leg 124 being angled upwardly from the central portion 116 at a sharper angle into engagement with the contact face 74 of the terminal 70 at all times. At the other end of the central portion 116, a leg 126 essentially coplanar with the central portion 116 extends away from the central portion 116 between the associated legs 120. Intermediate its proximal and distal ends, the leg 126 has a U-shaped, depending portion 130. As best shown by FIG. 5, the U-shaped portion 130 is disposed on the axis 84 of the positive terminal 34a and projects downwardly into the respective circular opening 98 of the plate 92. The depth of the U-shaped portion 130 is sufficient to engage the contact face 72 of the terminal 34a when the rod 80 and the plate 92 are in the extreme position illustrated by FIG. 5. When, however, the rod 80 and the plate 92 are moved to the extreme position illustrated by FIG. 6, electrical engagement between the U-shaped portion 130 and the contact face 72 is broken.

The spring element 110 serves two major functions. First, it serves as the movable element of the switch 38 in that it has a closed state connecting contact faces 72 and 74 when the rod 80 and the plate 92 are in the extreme position of FIG. 5 and an open state not connecting the contact faces 72 and 74 when the rod 80 and the plate 92 are in the extreme position of FIG. 6. Second, it continually biases the plate 92 and the rod 80 toward the extreme position illustrated by FIG. 5.

The unique and automatic mode of operation of the connector 30 of this invention will now be described with reference to FIGS. 3–6. If the connector 30 is connected to a rechargeable battery 32a, the distal end of the plunger rod 80 merely enters the recess 52 between the battery terminals 36 as the terminals 34 and 36 are secured together. No force is applied to the plunger rod 80 by the battery 32a, and the biasing action of the spring element 110 maintains the rod 80 and the plate 92 in the extreme position of FIG. 5. The spring element 110 provides electrical continuity between the terminals 34a and 70, and the battery 32a will therefore be charged by a trickle current from the charging circuit 16. If, however, the connector 30 is connected to a non-rechargeable battery 32b, the distal end of the plunger rod 80 engages the wall 50 as the terminals 34 and 36 are moved toward each other. Continued movement of the terminals 34 and 36 toward each other causes the wall 50 to exert sufficient force on the rod 80 to overcome the biasing action of the spring element 110 to move the rod 80 and the plate 92 to the extreme position of FIG. 6. In this position, the spring element 110 is highly stressed, and the energy stored therein will return the rod 80 and the plate 92 to the position of FIG. 5 when the battery 32b is removed from the connector 30. Moreover, in the position of FIG. 6, the U-shaped portion 130 of the spring element 110 no longer contacts the contact face 72. As a result, a non-rechargeable battery 32b connected to the connector 30 cannot be charged from the charging circuit since there is no electrical continuity between the terminals 34a and 70.

While a preferred embodiment of the invention has been illustrated and described, it will be appreciated by those skilled in the art that the invention may take on other forms within the spirit and scope of the invention. For example, the illustrated connector 30 includes a separate housing 60 connected by flexible wires 62, 64 and 66 to the rest of the circuit. It would be possible to replace the wires by hard wiring on a circuit board of the like. The separate housing could be replaced with an integrated housing formed as part of a circuit board, cabinet part, or the like. In fact, it would be possible to design the connector in a manner such that the discrete terminals 34 and 70 are eliminated and the spring element 110 makes direct contact with the battery terminal 36a and the battery charging circuity. Similarly, the rod 80 and the plate 92 and the spring element 110 can take on alternative forms while still performing in the manner shown and described.

From the foregoing, it will be appreciated that the universal connector of this invention can be attached to either rechargeable or non-rechargeable batteries, inherently permitting charging of rechargeable batteries and preventing attempted charging of non-rechargeable batteries. Use of the connector does not require any conscious thought or action on the part of the user as to whether or not charging is desirable, and the connector eliminates need for multiple connectors and/or written instructions or warnings as to proper and improper operation.

While the invention has been particularly shown and described with reference to a preferred embodiment thereof, it will be understood by those skilled in the art that various changes, including those specifically described above, in form, detail, and application may be made therein without departing from the spirit and scope of the invention. Accordingly, it is intended that all such modifications and changes be included within the scope of the appended claims.

What is claimed as new and is desired to secure by Letters Patent of the United States is:

1. In an electrical product having battery recharging means and a load adapted for energization from a battery, a battery connector comprising:

terminal means adapted to contact the output terminals of either a non-rechargeable battery having a first physical configuration or a rechargeable battery having a second physical configuration, said terminal means coupled to the load of the product such that the load may be energized from either the non-rechargeable battery or the rechargeable battery, circuit means coupling said terminal means and the battery recharging means, said circuit means including a switch having an open state preventing charging through said circuit means of a battery coupled to said terminal means and a closed state permitting charging through said circuit means of a battery coupled to said terminal means, and biased actuating means coupled to said switch for moving said switch between its closed and open states, said actuating means adapted to coact with the first physical configuration of a non-rechargeable battery to move said switch against a bias to its open state and adapted to coact with the second physical configuration of a rechargeable battery to allow said switch to move with said bias to its closed state, whereby the physical configuration of a battery connected to the battery connector determines whether or not the battery will be charged.

2. A battery connector as defined in claim 1 for use with non-rechargeable and rechargeable batteries in which the first physical configuration includes a wall portion at a predetermined location relative to the battery connector when said terminal means is contacting the output terminals of the non-rechargeable battery and the second physical configuration includes an absence of a wall portion at said predetermined location relative to the battery connector when said terminal means is contacting the output terminals of the rechargeable battery, said actuating means including biasing means and a member movable between a first position in which said member extends into said predetermined location and a second, retracted position, said member being aligned such that contact thereof with the wall portion of a non-rechargeable battery will move said member to said second, retracted position when a non-rechargeable battery is connected to the battery connector, said switch, said biasing means, and said member being interconnected such that said biasing means biases said switch and said member to said closed and first positions, respectively, and movement of said member to said second position moves said switch against the action of said biasing means to said open position.

3. A battery connector as defined by claim 2 in which said terminal means comprises a pair of spaced-apart terminals adapted for connection to conventional 9 volt battery terminals and in which said member comprises a plunger located between said pair of terminals, said plunger having an axis parallel to the axes of said pair of terminals and being movable along said axis between said second position in which the distal end of said plunger extends a predetermined distance from the connector and said first position in which the distal end of said plunger extends a greater predetermined distance from the connector.

4. A battery connector as defined by claim 2 in which said biasing means comprises a conductive spring element, said spring element also comprising at least a portion of said switch.

5. A battery connector as defined by claim 4 in which said terminal means comprises a pair of spaced-apart terminals adapted for connection to conventional 9 volt battery terminals and in which said member comprises a plunger located between said pair of terminals and having an axis parallel to the axes of said pair of terminals, said plunger being movable along said axis between said second position in which the distal end of said plunger extends a predetermined distance from the connector and said first position in which the distal end of said plunger extends a greater predetermined distance from the connector.

6. In an electrical product having battery recharging means and a load adapted for energization from a battery, a battery connector comprising:
   a housing,
   a pair of terminals mounted on the exterior of said housing for connection to the output terminals of a battery, a selected one of said pair of terminals extending through said housing to the interior thereof,
   means for electrically coupling said pair of terminals to the load,
   an electically conductive element within said housing movable between a first position in which said conductive element contacts said selected terminal and a second position in which said conductive element is spaced from said selected terminal,
   means for electrically coupling said conductive element to the battery recharging means, and
   operating means coupled to said conductive element and extending therefrom through said housing to the exterior thereof, said operating means operable from the exterior of said housing for selectively moving said conductive element from said first position to said second positions.

7. A battery connector as defined by claim 6 in which said electrically conductive element is a spring element that is relatively unstressed in said first position and is substantially stressed in said second position, the stress induced within said spring element as a result of operation of said operating means biasing said spring element toward said first position from said second position such that said spring element moves to said first position and contacts said selected terminal when operation of said operating means ceases.

8. A battery connector as defined by claim 7 in which said pair of terminals are adapted for connection to conventional 9 volt battery terminals and in which said operating means comprises a plunger located between said pair of terminals, said plunger having an axis parallel to the axes of said pair of terminals and being movable along said axis.

9. A battery connector as defined by claim 7 in which said means for electrically coupling said spring element to the battery recharging means includes a third terminal on the interior of said housing, said spring element contacting said third terminal when said spring element is in at least said first position.

10. A battery connector as defined by claim 9 in which said pair of terminals are adapted for connection to conventional 9 volt battery terminals and in which said operating means comprises a plunger located between said pair of terminals, said plunger having an axis parallel to the axes of said pair of terminals and being movable along said axis.

* * * * *